United States Patent
Hensler et al.

(10) Patent No.: US 10,448,012 B2
(45) Date of Patent: *Oct. 15, 2019

(54) SYSTEM AND METHOD FOR DATA REDUCTION BASED ON SCENE CONTENT

(71) Applicant: Pixvana, Inc., Seattle, WA (US)

(72) Inventors: William Hensler, Seattle, WA (US); Forest Key, Seattle, WA (US); Sean Safreed, Seattle, WA (US); Scott Squires, Studio City, CA (US)

(73) Assignee: Pixvana, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/821,529

(22) Filed: Nov. 22, 2017

(65) Prior Publication Data

US 2018/0146212 A1  May 24, 2018

Related U.S. Application Data (60) Provisional application No. 62/428,392, filed on Nov. 30, 2016, provisional application No. 62/425,604, (Continued)

(51) Int. Cl.
*G06T 7/11* (2017.01)
*H04N 19/115* (2014.01)
(Continued)

(52) U.S. Cl.
CPC ............ *H04N 19/115* (2014.11); *G06F 3/011* (2013.01); *G06F 3/012* (2013.01); *G06F 3/013* (2013.01);
(Continued)

(58) Field of Classification Search
CPC .............. H04N 19/115; H04N 13/106; H04N 5/23238; H04N 19/17; H04N 19/119; H04N 19/137; H04N 1/646; H04N 19/172; H04N 13/344; H04N 13/383; H04N 13/139; H04N 19/167; H04N 19/162; H04N 19/597; G06F 3/0484; G06F 3/012; G06F 3/013; G06F 3/011; G06T 2207/20221; G06T 3/4023;
(Continued)

(56) References Cited

U.S. PATENT DOCUMENTS

2011/0214072 A1* 9/2011 Lindemann ............ G01C 11/02
715/757
2013/0128957 A1* 5/2013 Bankoski ................ G06T 5/002
375/240.03

(Continued)

OTHER PUBLICATIONS

Blum et al, The effect of out-of-focus blur on visual discomfort when using stereo displays (Year: 2010).*

(Continued)

*Primary Examiner* — Shan E Elahi
(74) *Attorney, Agent, or Firm* — Fenwick & West LLP (57) ABSTRACT

A production system determines which areas or portions of a video file (e.g., for a scene) are static and which areas contain motion. Instead of steaming redundant image data for the static areas of the video, the production only sends image data for or updates the areas of each frame that contain motion to minimize an amount of data being streamed to a head mounted display (HMD) without compromising image quality.

15 Claims, 4 Drawing Sheets

Related U.S. Application Data filed on Nov. 22, 2016, provisional application No. 62/428,399, filed on Nov. 30, 2016.

(51) Int. Cl.

| | |
|---|---|
| *H04N 19/167* | (2014.01) |
| *H04N 19/597* | (2014.01) |
| *H04N 19/162* | (2014.01) |
| *H04N 13/139* | (2018.01) |
| *H04N 13/344* | (2018.01) |
| *H04N 13/383* | (2018.01) |
| *H04N 19/172* | (2014.01) |
| *G06T 7/174* | (2017.01) |
| *G06F 3/01* | (2006.01) |
| *G06T 5/00* | (2006.01) |
| *H04N 1/64* | (2006.01) |
| *H04N 19/119* | (2014.01) |
| *H04N 19/137* | (2014.01) |
| *G06T 5/50* | (2006.01) |
| *G06T 19/00* | (2011.01) |
| *G06F 3/0484* | (2013.01) |
| *H04N 5/232* | (2006.01) |
| *H04N 13/106* | (2018.01) |
| *H04N 19/17* | (2014.01) |
| *G06T 3/40* | (2006.01) |

(52) U.S. Cl.
CPC ............ *G06F 3/0484* (2013.01); *G06T 5/002* (2013.01); *G06T 5/50* (2013.01); *G06T 7/11* (2017.01); *G06T 7/174* (2017.01); *G06T 19/006* (2013.01); *H04N 1/646* (2013.01); *H04N 5/23238* (2013.01); *H04N 13/106* (2018.05); *H04N 13/139* (2018.05); *H04N 13/344* (2018.05); *H04N 13/383* (2018.05); *H04N 19/119* (2014.11); *H04N 19/137* (2014.11); *H04N 19/162* (2014.11); *H04N 19/167* (2014.11); *H04N 19/172* (2014.11); *H04N 19/597* (2014.11); *G06T 3/4023* (2013.01); *G06T 2207/20192* (2013.01); *G06T 2207/20221* (2013.01); *G06T 2219/024* (2013.01); *H04N 19/17* (2014.11)

(58) Field of Classification Search
CPC ..... G06T 2207/20192; G06T 2219/024; G06T 19/006; G06T 5/50; G06T 7/11; G06T 7/174; G06T 5/002
USPC .................................................. 375/240.02
See application file for complete search history.

(56) References Cited

U.S. PATENT DOCUMENTS

| | | | | |
|---|---|---|---|---|
| 2015/0304665 | A1* | 10/2015 | Hannuksela | H04N 19/70 375/240.02 |
| 2016/0026253 | A1* | 1/2016 | Bradski | G02B 27/225 345/8 |
| 2017/0248796 | A1* | 8/2017 | Banks | H04N 13/271 |
| 2017/0374375 | A1 | 12/2017 | Makar et al. | |
| 2018/0089903 | A1* | 3/2018 | Pang | H04N 19/33 |

OTHER PUBLICATIONS

Rao et al, [POSTER] Reactive displays for virtual reality (Year: 2017).*
Schönauer et al, 3D building reconstruction and thermal mapping in fire brigade operations (Year: 2013).*
United States Office Action, U.S. Appl. No. 15/821,527, dated Jan. 29, 2019, 18 pages.
United States Office Action, U.S. Appl. No. 15/821,185, dated Feb. 25, 2019, ten pages.

\* cited by examiner

SYSTEM AND METHOD FOR DATA REDUCTION BASED ON SCENE CONTENT

CROSS REFERENCE TO RELATED APPLICATIONS

This application claims priority to U.S. Provisional Application No. 62/425,604, filed Nov. 22, 2016, U.S. Provisional Application No. 62/428,392, filed Nov. 30, 2016, and U.S. Provisional Application No. 62/428,399, filed Nov. 30, 2016, which are incorporated herein by reference in their entirety. This application is related to U.S. patent application Ser. No. 15/821,527, filed Nov. 22, 2017 titled Variable Image Data Reduction System and Method and U.S. patent application Ser. No. 15/821,185, filed Nov. 22, 2017 titled Analytic Reprocessing for Data Stream System and Method, which are all incorporated by reference herein in their entirety.

BACKGROUND

This disclosure relates generally to image preprocessing, and more specifically to preparing a video file for consumption on a virtual reality headset.

Virtual reality headsets simulate environments by providing video for a large field of view (e.g., 180 to 360 degrees). An image capture rig includes multiple cameras each capturing a different portion of a scene. These sources images capture the same moment while each capturing a different portion of the scene that partially overlaps with the field of view of at least one of the other source images. The source images are then stitched together to create a master plate for a frame that covers the large field of view captured by the cameras of the image capture rig. The compilation of each master plate forms a master file for the virtual reality video file. The video file then goes through a number of transformations and other processing steps to prepare the video file for encoding and eventually consumption by a user on a virtual reality headset.

SUMMARY

Since virtual reality (VR) videos often cover a large view (e.g., 180° to 360°), at least some scenes of the VR videos are often shot or captured using a locked-off or nonmoving camera or created with constant background or graphic resulting in areas with little or no motion. A production system, thus, determines which areas or portions of a video file (e.g., for a scene) are static and which areas contain motion. Instead of steaming redundant image data for the static areas of the video, the production only sends image data for or updates the areas of each frame that contain motion to minimize an amount of data being streamed to a head mounted display (HMD) without compromising image quality.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
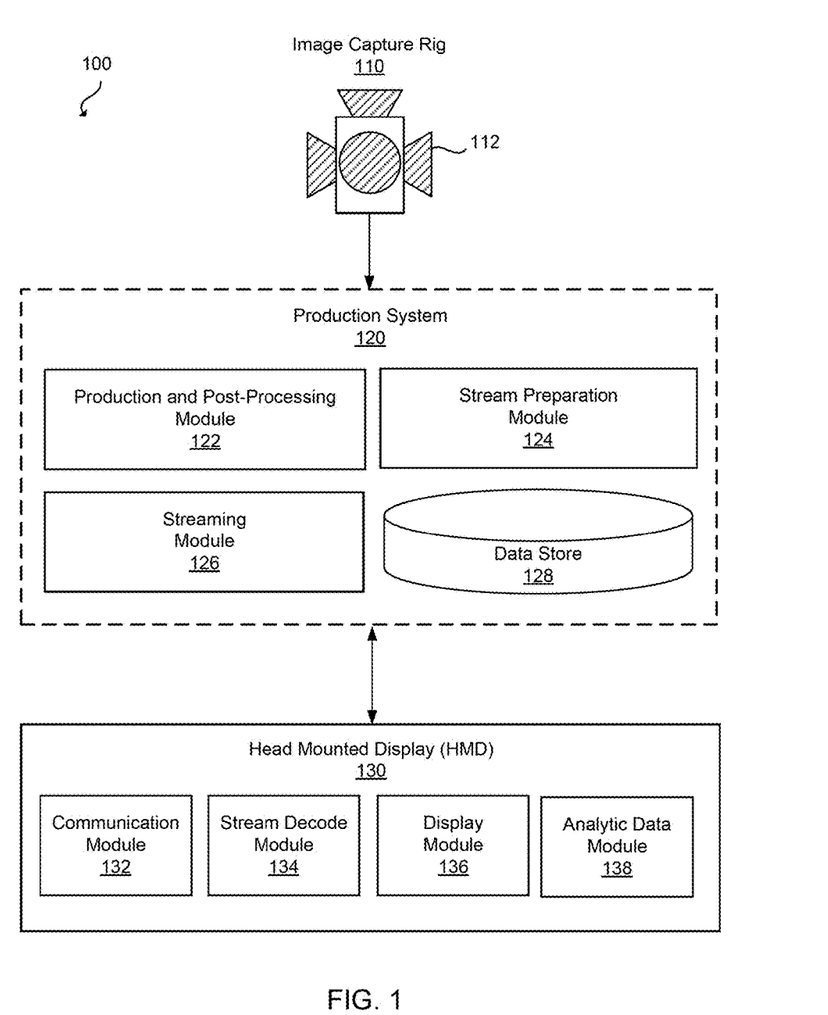
FIG. 1 shows an example system in which audio and video content is prepared for consumption in a head mounted display (HMD) or other computing device, in accordance with at least one embodiment.

FIG. 1 shows system 100 in which audio and video content is prepared for consumption in head mounted display (HMD) or other computing device. In this example, system 100 includes image capture rig 110, production system 120, and HMD 130. While FIG. 1 shows a single image capture rig 110, a single production system 120, and a single HMD 130, in other embodiments, any number of these components may be included in the system and, in alternative configurations, different and/or additional components may also be included in system 100. For example, there may be multiple HMDs 130 each having an associated console, input interface, and being monitored by one or more imaging devices.

Image capture rig 110 includes one or more cameras with either a wide field of view (FOV) or each having overlapping field of views (FOVs) relative to other cameras in a rig. In this example, FIG. 1 shows image capture rig 110 with multiple cameras 112. Each camera 112 is mounted in image capture rig 110 to capture individual images of a different FOV that overlaps with the fields of view of adjacent cameras 112. The individual images are subsequently stitched together based on their overlapping fields of view to cover a wide FOV (e.g., 180° to 360°) that is larger than any one camera 112. Image capture rig 110 can alternatively be a single wide angle camera built specifically for virtual reality (VR) and/or augmented reality (AR) applications that is capable of capturing images at a wide FOV. Accordingly, image capture rig 110 captures images in a sequence (e.g., frames of video) via cameras 112 and provides the images to production system 120.

Production system 120 obtains the images captured via cameras 112 from image capture rig 110 and prepares the video file for delivery to HMD 130 (and subsequent consumption by a user of HMD 130). Production system 120 includes production and post-processing module 122, stream preparation module 124, streaming module 126, and data store 128. Production and post-processing module 122 stitches images obtained from image capture rig 110 to create a master negative for each frame of a master video file that covers the wide FOV from a combination of cameras 112 of image capture rig 110. Thus, the master negative is produced by stitching multiple videos and eliminating distortion and aberrations, which results in a high resolution, multi-camera captured, stitched file of 10-20 k+ horizontal resolution. Stream preparation module 124 prepares the master video file for delivery through one or more streaming protocols to HMD 130. Since decoding of the master video file requires a particular size and data rate, the master video file is converted into a format best suited to HMD 130 (e.g., resolution of the headset, video decode performance of the headset, etc.) and transmission speed of the network between production system 120 (or whatever system eventually steams the master file) and HMD 130. Streaming module 126 iteratively engages HMD 130 with a machine learning process to deliver the master video file to HMD 130. Data store 128 stores the master video file and the various format specifications and requirements for delivering the master video file to HMD 130, other HMDs, and/or other computing devices. Production and post-processing module 122, stream preparation module 124, and streaming module 126 will be further described with respect to FIG. 2.

HMD 130 presents virtual and/or augmented reality content to a user. Example content includes images, video, audio, or some combination thereof. During content playback, HMD 130 may manage buffering of each chunk of frames, caching resources locally to cover the FOV determined via positional tracking. Audio content may be presented via a separate device (e.g., speakers and/or headphones) external to HMD 130 that receives audio information from HMD 130, a console associated with HMD 130, or both. HMD 130 includes communications module 132, stream decode module 134, display module 136, and analytic data module 138. HMD 130 may include fewer or more modules than those shown in FIG. 1.

Communications module 132 establishes a communication channel with production system 120 by sending a request for content and then receives the content production system 120. Communication module 132 may send multiple inputs requests based on the expected head motion and playback time in order to receive the correct content for the user's viewing location.

Stream decode module 134 receives the content via communications module 132 from production system 120 (or one or more remote servers associated with production system 120) and decodes the video, audio, subtitle data for each frame from a data stream. The content decoded by stream decode module 134 may also include a displacement map or a depth map for the content, stereo information, and auxiliary information for user interaction. Further, since content for the right eye in stereo is only slightly different than the content for the left eye, difference or displacement information or data can be provided for each frame of content. Thus, from image data for a single perspective, the two perspectives required for stereo imagining can be generated using the image data for the single perspective with the difference or displacement data.

Display module 136 manages operation of an electronic display screen that presents the content (e.g., visual information) of the master video file decoded by stream decode module 134. The electronic display screen may be a liquid crystal display (LCD), an organic light emitting diode (OLED) display, and so forth. Further, display module 136 may optionally apply sharpening and/or a color transform of the content that is particular to the specifications of HMD 130 before presenting the content to the user.

Analytic data module 138 iteratively engages production system 120 with a machine learning process to facilitate the delivery and correct specification of the master video file to HMD 130. In one embodiment, at the time of playback and for each frame, analytic data module 138 caches and sends analytical data to production system 120 about the position of HMD 130, the motion during the playback of each frame, a gaze direction of the user as supplied by eye-tracking system. The data rate of analytic data provided to production system 120, in one embodiment matches the temporal resolution of the tracking accuracy of HMD 130 (e.g., every 1/60th of a second provides a position and vector of motion). This analytic stream will be captured and transmitted back to production system 120 for analysis.

Initially, for new master video files, production system 120 does not possess information for where in a scene users tend to look or what objects tend to dominate the gaze direction, viewing location, or attention of users. Thus, analytic data module 138 may additionally track the motion and directional view of the users, aggregate this data for all users to determine where in the FOV or scene user's tend to look, and re-encode the data stream of the master video file to prioritize providing locations in the FOV in relatively high quality during content delivery. In one embodiment, the result is a new set of output tiles and/or playlist driven by aggregate the viewing habits of users for any piece of content.

Figure 2:
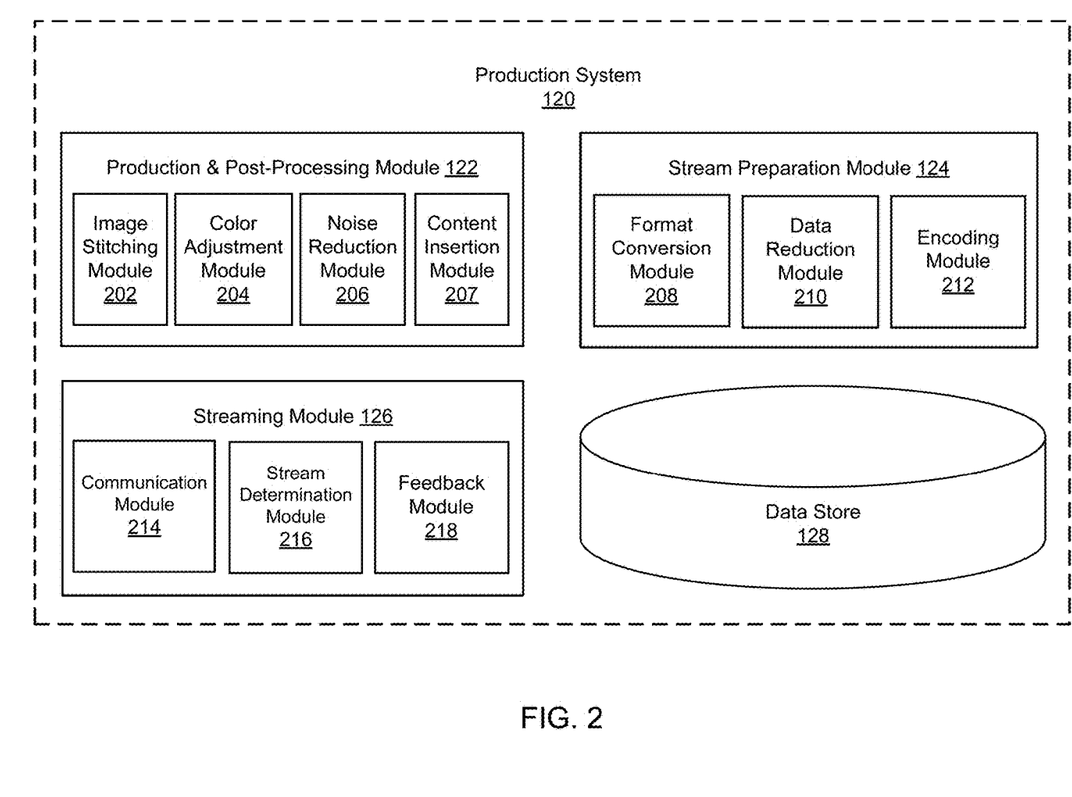
FIG. 2 shows an example production system, in accordance with at least one embodiment.

FIG. 2 shows production system 120 including production and post-processing module 122, stream preparation module 124, and streaming module 126. The following description of production system 120 describes modules, components, techniques, and other processes of a mono processing embodiment for processing content (e.g., virtual reality content, augmented reality content). Thus, there is no stereo imagery in the origination of the content (e.g., images captured by image capture rig 110) and the view in the right and left eye of HMD 130 are the same. For stereo content, each of the following steps can be performed in parallel while separately taking into account that the left and right frames in the stereo pair are processed in parallel for representing the same temporal moment with a slight offset of viewing angle. A disparity map could be further packaged as data for each frame and sent to HMD 130 with the content as part of the stream.

Production and Post-Processing

Production and post-processing module 122 stitches images obtained from image capture rig 110 and performs a series of other processing techniques to create a master negative for each frame of the master video file. Production and post-processing module 122, in one embodiment, includes image stitching module 202, color adjustment module 204, a noise reduction module 206, and a content insertion module 207, as shown in FIG. 2.

In alternate embodiments, more or fewer modules and functions may be included in the Production and post-processing module 122. For example, modules to perform special effects, vector graphics, animations, or other production or post-processing effects that may be configurable by the end user.

Stitching module 202 receives images corresponding to frames of a video file captured by image capture rig 112. The images are received in multiple input video streams (e.g., 2 to n input video streams) each corresponding to a different camera 112 of image capture rig 110. As described above, each camera has a different FOV relative to other cameras 112 and the FOV of adjacent cameras 112 partially overlapped to allow for image registration based on the overlapping regions. Stitching module 202, thus, determines an appropriate mathematical model relating pixel coordinates in one image to corresponding pixel coordinates in another adjacent image to align the images. Since cameras 112 are fixed in image capture rig 110 relative to each other, the mathematical model relating pixel coordinates is often predetermined or known before the images are captured. Accordingly, stitching module 202 produces a stitched negative for each frame of the video file covering a wide FOV (e.g., 180° to 360°).

Color adjustment module 204 adjusts the color and other properties of the stitched negative. The images obtained from image capture rig 110 are initially in a raw (i.e., flat or log gamma) format corresponding to the native color space of cameras 112 and (after the images are stitched together) the stitched negative is processed or converted to a standard color space for video processing (e.g., Rec 709, DCI P3, Rec 2020, etc.) depending on device intention and processing. Color adjustment could alternatively be performed prior to image stitching or other processes discussed herein as well. Further, the stitched negative could be gamma converted to linear color space appropriate for downstream effects and compositing. Color adjustment module 204 also performs color correction to enhance the contrast, shift the white balance, provide creative looks to better match a creative intent, and/or add glows or local contrast to change the mood of a master video file.

Noise Reduction module 206 applies spatial and/or temporal noise reduction filters that remove noise. For example, noise can be based on heuristics that first determine a noise level and then applies a frequency based noise reduction to each frame (i.e., stitched negative) based on spatial noise characteristic and temporal motion across multiple frames (e.g., 3 frames).

Accordingly, production and post-processing module 122 stitches images obtained from image capture rig 110 to create a single video file from each input stream and performs a series of processing techniques to create the master video file for viewing by a user via HMD 130. The master video file is then further formatted based on the device type of HMD 130 and other requirements and constraints associated with streaming the master video file to HMD 130, as discussed below with respect to stream preparation module 124.

Stream Preparation

Stream preparation module 124 prepares the master video file for delivery through one or more streaming protocols to HMD 130 based on HMD 130 device type and other constraints associated with streaming the master video file to HMD 130. Stream preparation module 124, in one embodiment, includes format conversion module 208, data reduction module 210, and encoding module 212, as shown in FIG. 2.

Format conversion module 208, in one embodiment, resizes each frame of the master video file and adjusts the format of each frame of the master video file to be compatible with one or more different HMD(s) 130. Thus, each frame of the master video file is resized to fit the final format of HMD 130, which may vary by device manufacture, operating system, video player, and so forth. For example, output could be as large as 16000×8000 pixels for higher-end devices, typically in an equi-rectangular format (e.g., twice the width as the height of the frame), and the format may be 3840×1920 for mobile applications. Production system 120 can support the resizing of frames in arbitrary size and formats with varying resampling filters including bilinear, bi-cubic and elliptically weighted averaging (EWA).

Further, based on the output device, the master video file is converted into a format suitable for encoding module 212 and stream decoding module of HMD 130. Accordingly, the master video file may start in an equi-rectangular format (e.g., a horizontal length containing 360 degrees of horizontal pixel data and a vertical length containing 180 degrees of vertical pixel data) and be converted to other formats using standard warping and tiling arrangement, such as a 6-sided cube map or a cube arrangement. The cube arrangement may be passed in the other packing formats as well that including cubic, spherical, tiled pyramids, and so forth.

Standard distortion maps may be extended to include alternate packing methods that are more appropriate for encoding module 212 of the pixel data or the FOV of the master. Other distortion maps could include an unrolled cylinder for a subset of each frame of the master video file. For example, the subset of each frame could include just the middle 120 degrees of the FOV band and small squares describing the pixel data for the top and bottom of the remaining FOV. Other shapes could be set such as a pyramid with four sides and a bottom, or more exotic shapes such as hexagonal pyramids or hexagonal spheres.

Data reduction module 210 applies one or more data reduction techniques or processes to the master video file to reduce the amount of data streamed to HMD 130 while prioritizing the quality of content of the master video file based on the user's viewing location, such that the user perceives no reduction in image quality. In one embodiment, stream determination module 216 processes the master video file into a series of tiles that cover the FOV of HMD 130 using a cropping function. For example, the master video file can be cropped into eight tiles (e.g., four vertical and two horizontal slices) to cover the full FOV of each frame of the master video file. The tiles can be defined by the FOV of HMD 130 including a band of extra area (referred to as a guard band) that includes an overlapping portion of adjacent tiles, which results in fewer tiles with more coverage of the full master image.

Further, data reduction module 210 can reduce the image quality of one or more tiles by selectively blurring or averaging of pixels to reduce image detail in areas that the user will likely not be as sensitive to in order to increase compression efficiency for encoding. For example, the image quality of one or more tiles can be reduced by blurring or averaging pixels associated with an expected edge of the FOV. The selective blurring could be defined by the lens characteristics of HMD 130 to define a default area to be smoothed.

To further lower the amount of data sent to encoding module 212, data reduction module 210, in one embodiment, processes the master video file into tiles and compresses the tiles as a function of position relative to a center tile. The center tile, in this embodiment, corresponds to either a determined or predicted viewing location of the user wearing HMD 130 that will change as the user moves their head and/or eyes to view additional content of the master video file. The center tile will also likely be located at the center of the display of the HMD. The center tile may not be compressed at all (or slightly depending on network bandwidth and HMD 130 capabilities) and the other tiles are decimated as a function of distance from the center tile. In this manner, the tile corresponding to the viewing location of the user is prioritized and provided in high quality, while tiles where the user isn't looking are compressed. Since the human eye requires time to adjust and would likely not be able to focus on an object with enough particularity having, for example, just turned their head, tiles other than the center tile are initially provided at a lower quality. Accordingly, when the user moves their head, the center tile is updated and the new center tile is provided at a high quality relative to the other tiles including a previous center tile, in this example.

Tile compression or decimation, in one embodiment, is variable and can be linear or non-linear in the horizontal and/or vertically direction. Compressing the tiles as a function of position relative to a center tile or viewing location of the user can be achieved by compressing the guard band areas through variable decimation of the pixels and a transfer function can describe this process. In one example, a linear transfer function could compress the guard bands by combining or averaging pixels in a linear ratio. For example, 4 or 8 or 10 pixels are filtered to 1 pixel. In another example, a non-linear function can be applied to decimate the guard band closest to FOV by a lower ratio, such as 2 to 1, while pixels at the outer horizontal edge could be compressed to a higher ratio up to 50 to 1. Further, a less linear process could also be applied to the compression of guard bands with a 2D map describing the ratio of compression between the current FOV inside an ellipse or irregular arbitrary shape and the outer rectangular shape matching the edge of a tile.

Further, since the human eye is also not as sensitive to certain color variations and textures, additional decimation for color space and based on a frequency analysis of the image can be applied. The image blurring could also take into account scene content so that less blurring is applied in areas of higher detail and more blurring is applied to areas of lower detail where the detail is separated by frequency of the scene content.

Accordingly, once the tiles are distorted into a final format, each tile is sent in the resized format to be packaged as a streaming video set. This process is used to prepare encoding module 212 for multiple resolutions depending on network bandwidth between production system 120 and HMD 130. Further, referring back to color adjustment module 204 described above, color adjustment module 204 may further process the color each tile that converts the color from the master color space of the master video file to the color space of HMD 130 or devices that cannot or do not use runtime color processing to match the input master color space to the display during playback.

In another embodiment, data reduction module 210 may replace some tiles entirely by a still image, a pixel map of a solid color (e.g., black) or by an arbitrary graphic. Temporal substitution may be defined for a few frames at a time, for an entire scene of similar content (e.g., a shot) or for the entire video clip. A heuristic determining the substitution of a single image over a number of tiles can be based on the content of a scene. For example, a video of a standup comedian where a spotlight is pointed at the comedian and the rest of the frame is essentially black. In this example, the entire frame other than the area covered by the spotlight could be replaced with a black background. The area of the spot light could be identified ahead of time by an author based on the editing of the content or determined automatically for some range of the horizontal section of the original.

Some tiles may also include important scene content or content that should be provided at a high quality. For example, this important scene content can include prominent faces, human or animal figures, known landmarks (e.g., Mt. Rushmore, etc.), and so forth. A scene content map that is either author-supplied (i.e., a map detailing important areas within a scene by the author or content publisher) or generated automatically through scene analysis could provide tile splitting based on these important details and the temporal changes of the scene content across the entire FOV of the frame. Other examples include a soccer player moving across a soccer field or a singer moving against a static background. Accordingly, the tile dimensions may, thus, be changed from frame to frame depending on the scene content and/or temporal characteristic of the content.

Encoding module 212 encodes the tiles of each frame of the master video file into a stand compression codec (e.g., H.264, H.265 MPEG, VP9, etc.) that aligns with the playback system of display module 136 of HMD 130. Other codecs may be targeted depending on the playback system and the prevailing standard for HMD 130. For example, tiles might be encoded in JPEG2000 format or Google VP9 standard based on client preference and/or system capability. Each tile size in the pyramid may be encoded in multiple quality levels to serve user-defined quality settings or to adjust for the available network bandwidth of HMD 130 (standard streaming encoding strategy). Further, for stereo content with a different frame for each eye, encoding module 212 could reduce the required information for encoding by creating a difference map between the right and left eye and encoding just the right eye and using a difference map to reconstruct the left during playback via stream decode module 134 on HMD 130.

Accordingly, once the master video file is appropriately encoded for video, the master video file can be split into chunks (e.g., approximately 0.125 to 2 sec corresponding to 10-60 frames at once) with the synchronized video, audio, subtitles, distortion map for the tiles, displacement or difference map for stereo reconstruction as well as stereo disparity map appropriate for each chunk ready for serving by streaming module 126.

Streaming

Streaming module 126, in one embodiment, communicates with HMD 130 to deliver the master video file to HMD 130. Streaming module 126, in one embodiment, includes communications module 214, stream determination module 216, and feedback module 218, as shown in FIG. 2. Streaming module 126 could be part of production system 120 or located remotely with one or more streaming servers.

Stream determination module 216, in one embodiment, determines the quality and/or what tiles of the one or more frames to provide HMD 130. Communication module 214 receives the multiple inputs and provides data associated with one or more of the multiple inputs to stream determination module 216. The inputs may include network bandwidth, the expected head motion or viewing location, and playback time, and so forth and stream determination module 216 determines what tiles to compress (e.g., decimate, blur, filter, etc.), as discussed above with respect to data reduction module 210. For example, based on the user's head and/or eye position(s) determined by one or more sensors in HMD 130, stream determination module 216 may define a center tile corresponding to where the user is looking (i.e., viewing location) within the content to prioritize the quality of the center tile to provide the content at a relatively high quality and, based on network bandwidth (and/or other considerations), determine a transfer function for compressing the tiles other than the center tile.

HMD 130 may manage buffering of each chunk of frames, caching resources locally that cover the FOV determined by positional tracking supplied by HMD 130, and then decoding the video data, audio data, subtitle data for each frame, displacement map, stereo information, and auxiliary information for user interaction and optionally applying sharpening, and a HMD color transform (if appropriate to the local device) before final display to the user. While presenting content, HMD 130 may additionally applying various techniques to hide the substitution of tiles by transitioning from one tile to another using, for example, a moving line describing the overlap (e.g., a wipe in video transition) or with a dissolve or fade between sources on HMD 130 to remove the differences in scene content between multiple streams while a user's head is in motion and while HMD 130 is receiving substitute frames to cover the current FOV.

Based on instructions from the content creator (e.g., embedded as metadata), the content insertion module 207 may switch in, add, or update content of the master video file with a new file package or content. The new content could, in one embodiment, be an advertisement or other message that comes into view via the master video file as the user is viewing the content of the master video file. Content insertion module 207 may achieve this by adding a file package to pre-created or filler content. For example, frames of the master video file may include template locations (e.g., blank billboards that can be seen in the background, product labels, designs on a T-shirt, etc.) and new content can be added into a template location from a stream based on information known about the user or by updating an advertisement created for a new season or campaign. The added content could also be triggered by a user interaction within the content of the master video file. The trigger may come from an input device of HMD 130 or hand-held device such as a wand, touch device, or gamepad. The new content may be composited into a tile and generated in real-time or during streaming from command instructions added by the content creator.

Further, while streaming, encoding module 212 may package new data streams that are dependent on user triggers. The new data streams are then inserted at playback time on HMD 130. The new data streams can be overlays that convey new data as part of the video experience shown by HMD 130 while packaged as auxiliary data by encoding module 212. The auxiliary data can, for example, be user interface elements, subtitles, or text annotation of specific scene content. This auxiliary data that may change depending on the player interaction or other data from the HMD.

Feedback module 218 receives content playback information from analytic data module 138 of HMD 130. As mentioned above, analytic data module 138 of HMD 130 iteratively engages production system 120 with a machine learning process to facilitate the delivery and correct specification of the master video file to HMD 130 and feedback module 218 stores these interactions for later analysis and analytic reprocessing, to determine where or at what within the content users are looking at, among other processes.

Data Reduction Based on Selective Motion Areas

Since virtual reality (VR) videos often cover a large view (e.g., 180° to 360°), at least some scenes of the VR videos are often shot or captured using a locked-off or nonmoving camera or created with constant background or graphic resulting in areas with little or no motion. Thus, in order to minimize an amount of data being streamed to HMD 130, production system 102 can identify areas or portions of the master video file that are static (i.e., static areas) and areas that contain motion (i.e., motion areas) and, instead of steaming redundant image data for the static areas, only send image data for the areas of each frame that contain motion (i.e., a subset of the master negative). Production system 102 can analyze the scene content to determine what scenes or portions of a scene are static and/or a user can provide hints to save extra analyzing steps.

Accordingly, production system 102 could then determine which areas had real motion and which areas were static by, for example, ignoring grain, noise, or subtle motions (e.g., slight leave motion) depending on preset thresholds. In one example, data reduction module 210 can compare each frame with a start frame, compare a frame average, or perform other techniques to determine the locations of static areas (and associated times) in a video. Accordingly, the end result is information of the areas affected (likely as a matte or alpha image) that are likely of irregular shapes. Data reduction module 210 could use these as is or could find the minimum rectangle covering each area. Optionally these areas could be expanded in either case and a feather applied to the matte to provide a smoother, less noticeable transition. Alternatively, if production system 102 determines that too much of the area of a frame (i.e., more than a threshold area) is covered by motion, production system 102 may reject this process and pass the frame on to other methods of processing moving footage.

Figure 3:
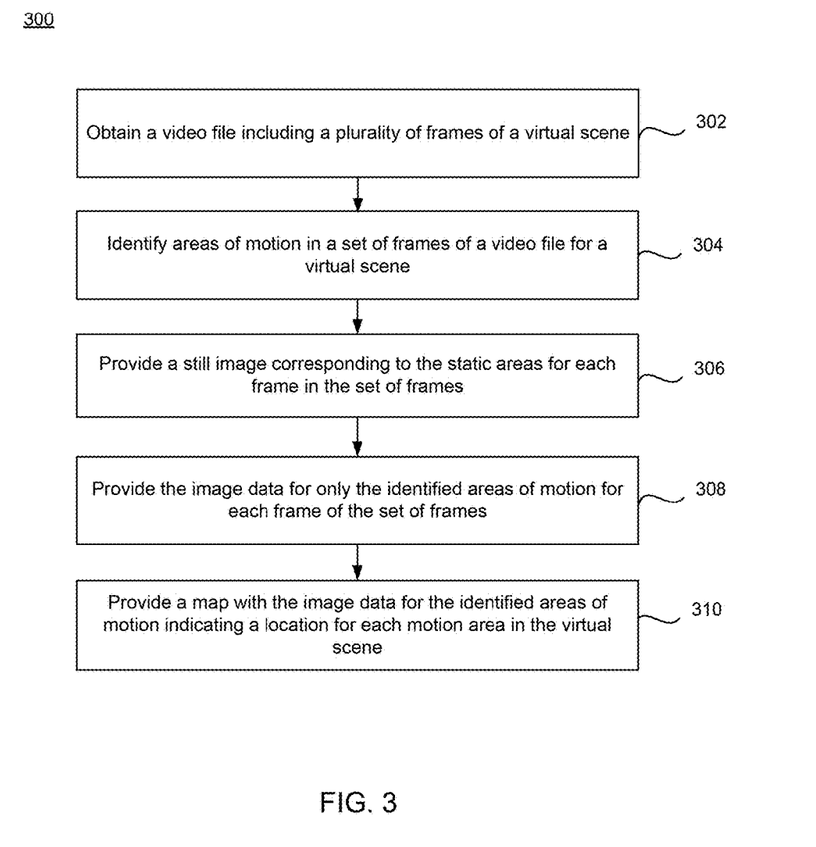
FIG. 3 is a flowchart for variable image data reduction based on scene content, in accordance with at least one embodiment.
Figure 4A:
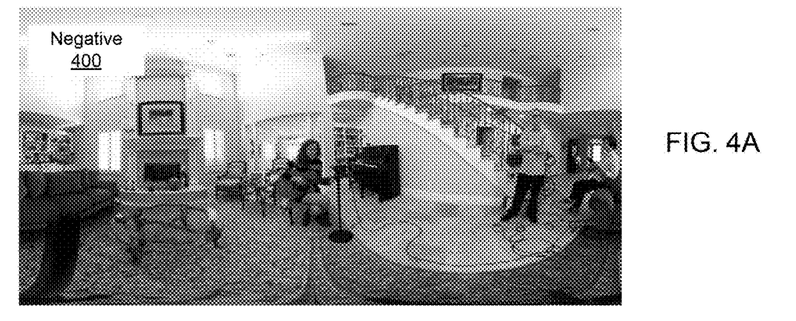
FIGS. 4A-4C shows a process of variable image data reduction based on scene content, in accordance with at least one embodiment.

FIG. 3 is a flowchart for variable image data reduction based on scene content, in accordance with at least one embodiment. First, production system 102 obtains 302 the video file that includes a plurality of frames of the virtual scene and identifies 304 which areas contain motion for a set of frames. FIG. 4A shows negative 400 (i.e., original equirectangular video frame) shot using a locked off camera. In this example, there is only slight motion in negative 400 that is associated with the areas corresponding to the singer, and the two individuals. As a first step, a user could be presented via a user interface with a prompt that enables an 'Analyze for Motion Areas' check box that provides the user with a choice of indicating with the entire master video file (or at least a portion of the entire master video file) is static (i.e., locked camera) or whether at least some scenes are static. Additionally, production system 102 may also analyzes the master video file and determine if all scenes are static. A hint from the user may save time and extra analysis that this is the case or not.

In this example, production system 102 identifies 304 areas that have real motion in the set of frames and which areas are static while ignoring grain, noise, or other motion below a preset (or variable) motion threshold. Here, production system 102 could compare the frame of negative 400 to a proceeding and/or subsequently following frame and perform a frame average or other technique to determine static areas within negative 400.

Figure 4B:
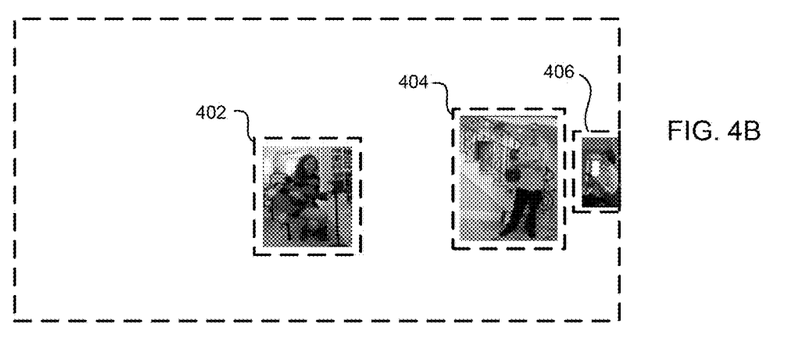

Accordingly, FIG. 4B shows motions areas that have been identified within negative 400. In this example, production system 102 has identified motion area 402 corresponding to the location of the singer, static area 404 and motion area 406 corresponding to a first and second individual watching the singer. In this example, production system 102 has determined the minimum rectangle covering each motion area (402, 404, and 406). Additionally, each of these areas could be expanded and a feather applied to the matte to provide a smoother, less noticeable transition. These areas may also be expanded if they are close enough to other areas to minimize the total number of motion areas, such as if a first static area is within a threshold distance of another motion area. For example, since motion area 404 and motion area 406 are relatively close and adjacent each other, production system 102 may expand motion area 404 to include motion area 406.

Figure 4C:
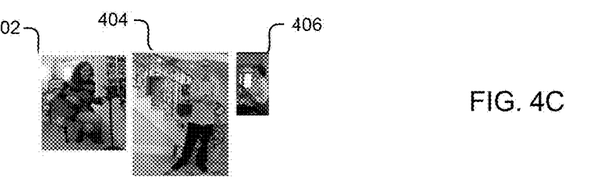

Accordingly, production system 102 could repack these motion areas in a smaller image by placing them next to each other and even possibly rotate some areas to provide the smallest area, as shown in FIG. 4C, which shows the minimum video area to be streamed. A still image corresponding to static area 404 is then provided 306 to HMD 130 for the set of frames while the image data for each motion area (402, 404, and 406) is provided to (or updated on) HMD 130 for each frame in the set of frames for which the still image is provided. Sizes of the minimum rectangles and repackaging may be influenced by the particular compression scheme being used. For example, if the compression scheme uses 16×16 pixel packing then the size and placement of the rectangles may be in 16 pixel increments to minimize compression artifacts.

Additionally, a UV map (or other type of data) indicating a location for each motion area is provided 310 that includes instructions for unpacking the motions areas with an indication for where to display each motion area on HMD 130.

This information would be passed onto HMD 130 as well as the motion areas and a static full still image of each shot.

HMD 130 would then retain the still image of each shot and composite the still image with each motion area, which would be unpacked and positioned accordingly. Accordingly, this could updated per shot, but in some cases it is more appropriate to perform for given set or range of frames or for every frame of the master video file.

The still areas could have a running noise pattern that matches the original or master video file (using parameters provided with the master video and other data) or a short sequence of frames could be looped. These steps could minimize noticeable differences between the static areas and motion areas. In one instance, it is possible that the user could choose to override the areas which have motion; such as if subtle motion in a given area was important or obviously cut off.

In one instance, the scaling of the still to motion areas is 1:1. In this instance, if a UV map were used, an integer UV map (pixel position) could be used since there is no scaling (or non-90 degree rotations). In another instance, however, scaling may provide some benefit for certain shots. For example, if the size of the combined motion area is small enough, at least a portion of the frame could avoid scaling down (or not as much scaling down as a full 360 video would require). Technically each motion area could be a different scale relative to each other and/or the still image.

Additional Configuration Information

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

What is claimed is:

1. A method comprising:
   obtaining, by a production system, a video file for a three-dimensional (3D) video, the video file including a plurality of frames of the 3D video;

comparing, by a processor of the production system, a first frame to a final frame in the set of frames in the video file;

identifying, by the processor of the production system, one or more areas of motion in the set of frames of the video file based on comparing the first frame to the final frame in the set of frames, areas other than the one or more motions areas of the set of frames corresponding to static areas;

determining, for each of the one or more areas of motion in the set of frames, a rectangle encompassing each of the one or more areas of motion for at least the duration of the set of frames, wherein determining the rectangle encompassing each of the one or more areas of motion includes:
  expanding the rectangle by a predetermined amount outside of the area of motion; and
  applying a border feather around the expanded rectangle to provide a smooth transition between the area of motion and the static areas;

providing, to a head mounted display of a user, a still image corresponding to the static areas for each frame in the set of frames; and providing, to the head mounted display, the image data for only the rectangle encompassing each of one or more motions areas for each frame of the set of frames including the border feather around each expanded rectangle, wherein the still image corresponding to the static areas of each frame in the set of frames is provided to the head mounted display once to prevent redundant static image data from being provided to the head mounted display.

2. The method of claim 1, further comprising:
providing, to the head mounted display, a map with the image data for the one or more motions areas indicating a location for each motion area in the 3D video, the head mounted display of the user using the map to reconstruct the 3D video on the head mounted display.

3. The method of claim 1, wherein the map further indicates a number of frames for which to incorporate the still image into the 3D video.

4. The method of claim 1, wherein comparing the first frame to the final frame in the set of frames includes:
  disregarding grain, noise, and motion in the video file that is below on a preset threshold amount of grain, noise, or motion.

5. A method comprising:
obtaining, by a production system, a video file for a three-dimensional (3D) video, the video file including a plurality of frames of the 3D video;

comparing, by a processor of the production system, a first frame to a final frame in the set of frames in the video file;

identifying, by the processor of the production system, one or more areas of motion in a set of frames of a video file for a three-dimensional (3D) video based on comparing the first frame to the final frame in the set of frames, areas other than the one or more motions areas of the set of frames corresponding to static areas;

providing, to a head mounted display of a user, a still image corresponding to the static areas for each frame in the set of frames;

providing, to the head mounted display, the image data for only the one or more motions areas for each frame of the set of frames; and providing, to the head mounted display, a map with the image data for the one or more motions areas indicating a location for each motion area in the 3D video, the head mounted display of the user using the map to reconstruct the 3D video on the head mounted display, wherein the still image corresponding to the static areas of each frame in the set of frames is provided to the head mounted display once to prevent redundant static image data from being provided to the head mounted display.

6. The method of claim 5, wherein the map further indicates a number of frames for which to incorporate the still image into the 3D video.

7. The method of claim 5, wherein comparing the first frame to the final frame in the set of frames includes:
  disregarding grain, noise, and motion in the video file that is below on a preset threshold amount of grain, noise, or motion.

8. The method of claim 5, wherein identifying the one or more areas of motion in the set of frames of the video file further includes:
  determining, for each of the one or more areas of motion in the set of frames, a minimum rectangle encompassing each of the one or more areas of motion for at least the duration of the set of frames.

9. The method of claim 8, wherein identifying the one or more areas of motion in the set of frames of the video file further includes:
  expanding the minimum rectangle encompassing each of the one or more areas of motion by a predetermined amount; and
  applying a border feather around the expanded minimum rectangle to provide a smooth transition between the areas of motion and the still image.

10. A non-transitory computer-readable storage medium comprising instructions that, when executed by a processor, cause the processor to:
  obtain a video file for a three-dimensional (3D) video, the video file including a plurality of frames of the 3D video;
  compare a first frame to a final frame in the set of frames in the video file;
  identify one or more areas of motion in a set of frames of the video file based on comparing the first frame to the final frame in the set of frames, areas other than the one or more motions areas of the set of frames corresponding to static areas;
  provide, to a head mounted display of a user, a still image corresponding to the static areas for each frame in the set of frames; and
  provide, to the head mounted display, the image data for only the one or more motions areas for each frame of the set of frames, wherein the still image corresponding to the static areas of each frame in the set of frames is provided to the head mounted display once to prevent redundant static image data from being provided to the head mounted display.

11. The non-transitory computer-readable storage medium of claim 10, further comprising instructions that, when executed by the processor, further cause the processor to:
  provide, to the head mounted display, a map with the image data for the one or more motions areas indicating a location for each motion area in the 3D video, the head mounted display of the user using the map to reconstruct the 3D video on the head mounted display.

12. The non-transitory computer-readable storage medium of claim 11, wherein the map further indicates a number of frames for which to incorporate the still image into the 3D video.

13. The non-transitory computer-readable storage medium of claim 10, wherein comparing the first frame to the final frame in the set of frames includes disregarding grain, noise, and motion in the video file that is below on a preset threshold amount of grain, noise, or motion.

14. The non-transitory computer-readable storage medium of claim 10, wherein identifying the one or more areas of motion in the set of frames of the video file further includes determining, for each of the one or more areas of motion in the set of frames, a minimum rectangle encompassing each of the one or more areas of motion for at least the duration of the set of frames.

15. The non-transitory computer-readable storage medium of claim 14 wherein identifying the one or more areas of motion in the set of frames of the video file further includes:
- expanding the minimum rectangle encompassing each of the one or more areas of motion by a predetermined amount; and
- applying a border feather around the expanded minimum rectangle to provide a smooth transition between the areas of motion and the still image.

\* \* \* \* \*